US005636361A

United States Patent [19]
Ingerman

[11] Patent Number: 5,636,361
[45] Date of Patent: Jun. 3, 1997

[54] MULTI-PROCESSOR COMPUTER SYSTEM HAVING DUAL MEMORY SUBSYTEMS FOR ENABLING CONCURRENT MEMORY ACCESS THERETO BY MORE THAN ONE PROCESSOR

[75] Inventor: Donald Ingerman, Boca Raton, Fla.

[73] Assignee: International Business Machines Corporation, Armonk, N.Y.

[21] Appl. No.: 362,389

[22] Filed: Dec. 22, 1994

[51] Int. Cl.$^6$ .............................. G06F 13/16; G06F 13/36
[52] U.S. Cl. ........................ 395/477; 395/474; 395/308
[58] Field of Search ............................... 395/308, 474, 395/477, 480, 475

[56] References Cited

U.S. PATENT DOCUMENTS 5,249,283  9/1993  Boland .
5,345,566  9/1994  Tanji et al. .......................... 395/308
5,453,957  9/1995  Norris et al. ...................... 365/230.04
5,497,355  3/1996  Mills et al. ........................ 365/230.08
5,511,224  4/1996  Tran et al. .

OTHER PUBLICATIONS

Frailong et al., "The Next-Generation SPARC Multiprocessing System Architecture", 1993, pp. 475-480, IEEE.

Primary Examiner—Eddie P. Chan
Assistant Examiner—Kevin L. Ellis
Attorney, Agent, or Firm—Calfee, Halter & Griswold LLP

[57] ABSTRACT

A multi-processor information handling system employs multiple multi-processor bus/memory subsystem groups wherein the processors may operate programs concurrently, and concurrent memory operations may be performed with the multiple memory subsystems via the associated multi-processor buses responsive to address location directors. The invention expands the system bandwidth and improves overall multi-processor information handling system performance.

4 Claims, 3 Drawing Sheets

MULTI-PROCESSOR COMPUTER SYSTEM HAVING DUAL MEMORY SUBSYTEMS FOR ENABLING CONCURRENT MEMORY ACCESS THERETO BY MORE THAN ONE PROCESSOR

FIELD OF THE INVENTION

The present invention relates generally to multi-processor information handling systems, and, more specifically, to multi-processor information handling systems comprising an address location director for each processor, multiple memory subsystems accessible by each processor, a multi-processor bus associated with each memory subsystem allowing information transfer between each processor and each memory subsystem, and wherein each address location director coordinates connected transaction memory operations between its associated processor and the memory subsystems via the multi-processor buses to allow each processor to operate programs concurrently by facilitating concurrent memory operations and to expand the system bandwidth such that overall system performance is improved.

BACKGROUND OF THE INVENTION

Information handling systems which incorporate multiple processors in the system design have the potential to increase system information processing capacity and to increase overall system performance. However, a substantial portion of this increased processing capacity potential is not realized using current multi-processor information handling system design architectures which incorporate a single memory subsystem which is accessible by each of the processors via a single multi-processor bus.

As is the case with single processor information handling systems, each processor in a multi-processor system operates on information (instructions and data) which resides in memory. Each processor can request information from the memory subsystem and such requests are conducted via the multi-processor bus. High speed processors can process more information per unit time than slower processors. In addition, newer processors require more information per request than older generation processors. In designing multi-processor information handling systems, it is desirable to avoid having to access the multi-processor bus and the memory subsystem. As more information is requested from the memory subsystem, the desired increases in system level performance diminishes as the processors place increased demands on the multi-processor bus and the memory subsystem.

The system level performance of a multi-processor information handling system is dependent upon its "system bandwidth", which is a function of the multi-processor bus bandwidth and the memory subsystem bandwidth and is a measure of the information transfer capability of the system expressed in megabytes per second (MB/sec). The system bandwidth is the amount of information that can be transferred per unit time between the memory subsystem and the requesting processors over the multi-processor bus. The system performance of multi-processor systems utilizing high-speed processors is constrained by the system bandwidth. The ability of multi-processor systems to effectively utilize the increased processing capacity of additional processors diminishes as the multi-processor bus utilization approaches 100% (i.e., as the multi-processor bus becomes saturated), as the memory subsystem utilization approaches 100% (i.e., as the memory subsystem becomes saturated), or as both the multi-processor bus and the memory subsystem become saturated.

Before describing the details of the present invention, a description of a generic prior art multi-processor information handling system may be helpful in understanding the advantages of the present invention. A typical multi-processor information handling system design incorporates a single multi-processor bus which allows two or more processors to access a single memory subsystem. In this type of architecture, the multi-processor bus is shared among the processors such that only one processor has control of the multi-processor bus at any given time. To perform a memory operation, the processor must control both the multi-processor bus and the memory subsystem.

The duration of a memory operation is defined as the time from the acquisition of the multi-processor bus until the time the multi-processor bus is released after the memory operation has been completed. During a typical memory access, a processor generates a request to gain access to the multi-processor bus to perform a memory operation with a memory subsystem. The transaction request is either a READ memory access wherein the processor is requesting to read information from the memory subsystem or a WRITE memory access wherein the processor is requesting to write information to the memory subsystem. This memory operation is referred to as a "connected transaction operation". During a connected transaction operation, information is transferred between the requesting processor and the memory subsystem over the multi-processor bus. In operation, a requesting processor makes a request and arbitrates for access to the multi-processor bus. Upon being granted access to the multi-processor bus, the requesting processor controls both the multi-processor bus and the memory subsystem for the duration of the memory operation.

The requesting processor maintains exclusive control over both the multi-processor bus and the memory subsystem for performing a memory operation. For example, a processor generates a request and that request in turn arbitrates to use the multi-processor bus. When the multi-processor bus becomes available, the request is granted access to the multi-processor bus and maintains exclusive control over the multiple-processor bus and the memory subsystem for the duration of a memory operation defined in the request (e.g., a READ memory access). Thus, the request maintains exclusive control over the multi-processor bus and the memory subsystem during the entire memory operation and a later request will not be accommodated until the prior request has been completed. For a READ memory access, a portion of the memory operation is associated with the wait period during which the multi-processor bus is idle awaiting the memory subsystem to respond to the requesting processor with information. For a WRITE memory access, a portion of the memory operation is associated with the wait period during which the multi-processor bus is idle awaiting the memory subsystem to respond to the requesting processor with an acknowledgement.

The system bandwidth of a multi-processor information handling system is determined by the time required to deliver an information block (generally a cache line or a cache line multiple). The time required to deliver an information block is measured from the moment a transaction request acquires the multi-processor bus until either the moment the requested information is received by the requesting processor for a READ memory access or the moment an acknowledgement is received by the requesting processor for a WRITE memory access. The system bandwidth is limited by, and a function of, the multi-processor bus clock rate, the memory subsystem clock rate, and the memory bandwidth. The multi-processor bus clock rate is divided by the time required for one cycle of the multi-processor bus, and is expressed in megahertz (MHz). The memory subsystem clock rate is the time required for one cycle of the memory subsystem, and is expressed in megahertz. The memory bandwidth is the memory subsystem clock rate multiplied by the number of information bytes in a memory access divided by the number of clock cycles required to perform a single memory access. For purposes of calculating the memory bandwidth, it is observed that the memory subsystem clock rate can be different from the multi-processor bus clock rate.

For a READ memory access, the system bandwidth is the sum of the time required for the processor to use the multi-processor bus to request memory access, plus the time required for the memory subsystem to perform the memory operation, plus the time required for the information to be returned to the processor via the multi-processor bus. For a WRITE memory access, the system bandwidth is the sum of the time required for the processor to use the multi-processor bus to request memory access, plus the time required for the memory subsystem to generate the acknowledgement, plus the time required for the acknowledgement to be returned to the processor via the multi-processor bus.

A multi-processor information handling system using this prior art connected transaction bus memory operation can achieve only a small increase in system bandwidth by doubling the multi-processor bus transfer width. For example, for a READ memory operation a typical move time for a 32 byte line of information on a 64 bit multi-processor bus is 5 multi-processor bus cycles (1 cycle for the address strobe plus 4 cycles for the information transfer), and a typical move time for a 32 byte line of information on a 128 bit multi-processor bus is 3 multi-processor bus cycles (1 cycle for the address strobe plus 2 cycles for the information transfer). An aggressive memory subsystem design is expected to require 8 memory cycles to perform the memory access. Therefore, a 64 bit multi-processor bus is expected to require 13 multi-processor bus cycles for a READ memory operation, and a 128 bit multi-processor bus is expected to require 11 multi-processor bus cycles for a READ memory operation. Under these operating conditions, a READ connected transaction bus memory operation is expected to result in a system bandwidth of 123 MB/sec for a 64 bit multi-processor bus operating at 50 MHz and 145 MB/sec for a 128 bit multi-processor bus operating at 50 MHz. Thus, by doubling the multi-processor bus transfer width from 64 bits to 128 bits, only an 18% increase in system bandwidth is expected. By way of further example, for a WRITE memory operation a typical move time for a 32 byte line of information on a 64 bit multi-processor bus is 6 multi-processor bus cycles (1 cycle for the address strobe plus 4 cycles for the information transfer plus 1 cycle for the acknowledgement signal), and a typical move time for a 32 byte line of information on a 128 bit multi-processor bus is 4 multi-processor bus cycles (1 cycle for the address strobe plus 2 cycles for the information transfer plus I cycle for the acknowledgment signal). An aggressive memory subsystem design is expected to require 8 memory cycles to perform the memory access. Therefore, a 64 bit multi-processor bus is expected to require 14 multi-processor bus cycles for a WRITE memory operation, and a 128 bit multi-processor bus is expected to require 12 multi-processor bus cycles for a WRITE memory operation. Under these operating conditions, a WRITE connected transaction bus memory operation is expected to result in a system bandwidth of 114 MB/sec for a 64 bit multi-processor bus operating at 50 MHz and 133 MB/sec for a 128 bit multi-processor bus operating at 50 MHz. Thus, by doubling the multi-processor bus transfer width from 64 bits to 128 bits, only a 17% increase in system bandwidth is expected. When doing POSTED WRITE operations the calculations and the results are different.

The incorporation of additional memory into the single memory subsystem of the prior art multi-processor design architecture only increases the memory subsystem capacity and does not increase the system bandwidth. The mere addition of memory to the memory subsystem does not change any of the parameters that determine system bandwidth and does not create additional paths for the flow of information between the processors and the single memory subsystem. Thus, while adding memory to the memory subsystem does increase the memory subsystem capacity, it does not improve overall multi-processor system bandwidth since the system can still only process one memory request at a time.

As described above, doubling the transfer width of the multi-processor bus generally yields only a small increase in the system bandwidth, and adding memory to the memory subsystem only increases the memory subsystem capacity and does not increase the system bandwidth. Therefore, the effective scalability of multi-processor information handling systems is limited using the prior art system design architecture.

SUMMARY OF THE INVENTION

According to the present invention, a multi-processor information handling system and a multi-processor information handling method are provided. A first processor and a second processor each have an address location director associated therewith for directing memory operations to a first memory subsystem and to a second memory subsystem. The first processor and the second processor access the first memory subsystem for performing memory operations therewith via a first multi-processor bus. The first processor and the second processor access the second memory subsystem for performing memory operations therewith via a second multi-processor bus. The first processor has a first bus interface unit associated therewith for accessing the first memory subsystem responsive to its associated address location director and a second bus interface unit associated therewith for accessing the second memory subsystem responsive to its address location director. The second processor has a first bus interface unit associated therewith for accessing the first memory subsystem responsive to its address location director and a second bus interface unit associated therewith for accessing the second memory subsystem responsive to its associated address location director. The first processor and the second processor may operate programs concurrently, and the first memory subsystem and the second memory subsystem are accessible by the first processor and the second processor for performing concurrent memory operations.

It is therefore an advantage of the present invention to provide multiple multi-processor bus/memory subsystem groups to expand the memory bandwidth and to increase the system level performance of multi-processor information handling systems. It is a further advantage of this invention to provide increased system level performance which can be easily integrated into existing multi-processor information handling system designs and into new multi-processor information handling system designs. These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to example the principles of this invention.

DETAILED DESCRIPTION OF THE PREFERRED EMBODIMENT

Figure 1:
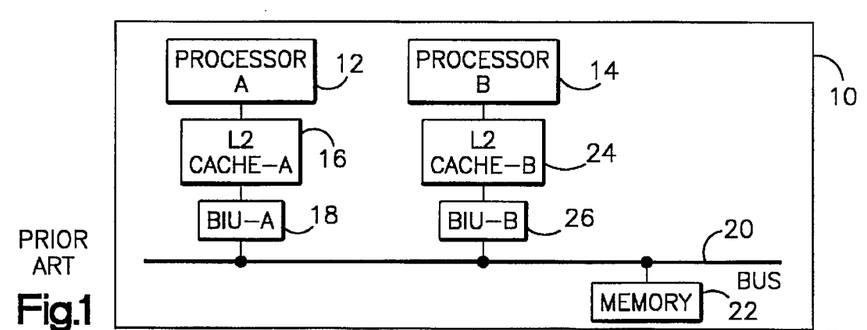
FIG. 1 is a block diagram of a generic prior art multi-processor system comprising two processors, two bus interface units, a multi-processor bus, and a memory subsystem.

Before describing the details of the present invention, a description of a generic prior art multi-processor system may be helpful in understanding the advantages of the multiple multi-processor bus/memory subsystem groups of the present invention. Current multi-processor systems use a single multi-processor bus, or parallel multi-processor buses, which allows the processors to sequentially access the single memory subsystem to perform connected transaction memory operations. Reference is had, therefore, to FIG. 1, which shows this type of prior art multi-processor system 10. Multi-processor system 10 includes first processor 12 and second processor 14. First processor 12 has an associated L2 cache memory 16 containing information for operation of first processor 12. First processor 12 also has an associated bus interface unit 18 for accessing multi-processor bus 20 to perform memory operations with memory subsystem 22. Second processor 14 has an associated L2 cache memory 24 containing information for operation of second processor 14. Second processor 14 also has an associated bus interface unit 26 for accessing multi-processor bus 20 to perform memory operations with memory subsystem 22. To perform memory operations with memory subsystem 22, first processor 12 and second processor 14 arbitrate for access to multi-processor bus 20. During a typical memory operation, either first processor 12 or second processor 14 maintains exclusive control over multi-processor bus 20 for the duration of the memory operation with memory subsystem 22. Thus, concurrent access to memory subsystem 22 by both first processor 12 and second processor 14 is not permitted and memory operations are performed sequentially. Furthermore, as additional processors are incorporated into the prior art multi-processor system design, increased utilization of multi-processor bus 20 and memory subsystem 22 occurs and the relative improvement in system performance becomes smaller with the incorporation of each additional processor. Although processing capacity can be increased by incorporating additional processors into prior art multi-processor systems, the rate of growth in system performance decreases with each additional processor as either the multi-processor bus becomes saturated, as the memory subsystem becomes saturated, or as both the multi-processor bus and the memory subsystem become saturated. Thus, prior art multi-processor systems are constrained by the multi-processor bus bandwidth and the memory subsystem bandwidth when operating high-speed processors in environments that do not have low cache miss rates.

Under the present invention, the solution to the connected-transaction multi-processor bus limited bandwidth problem is to expand the system bandwidth. The present invention modifies the prior art multi-processor information handling system design by incorporating two or more multi-processor bus/memory subsystem groups into the system design to expand the system bandwidth. As provided by the present invention, each multi-processor bus/memory subsystem group comprises a multi-processor bus which is connected to each of the processors and an independent memory subsystem which can be accessed by each of the processors. The arbitration for each multi-processor bus is independent of the arbitration for any other multi-processor bus. In one configuration, a multi-processor information handling system using the present invention can have two processors and two multi-processor bus/memory subsystem groups such that each processor is connected with each multi-processor bus and each processor can access each memory subsystem via the multi-processor bus associated with that memory subsystem, and wherein each multi-processor bus/memory subsystem group which operates using an arbitration protocol independent of the other multi-processor bus/memory subsystem groups. Thus, the present invention achieves expanded memory bandwidth and increased system level performance by allowing the multi-processor information handling system to perform concurrent memory operations.

Figure 2:
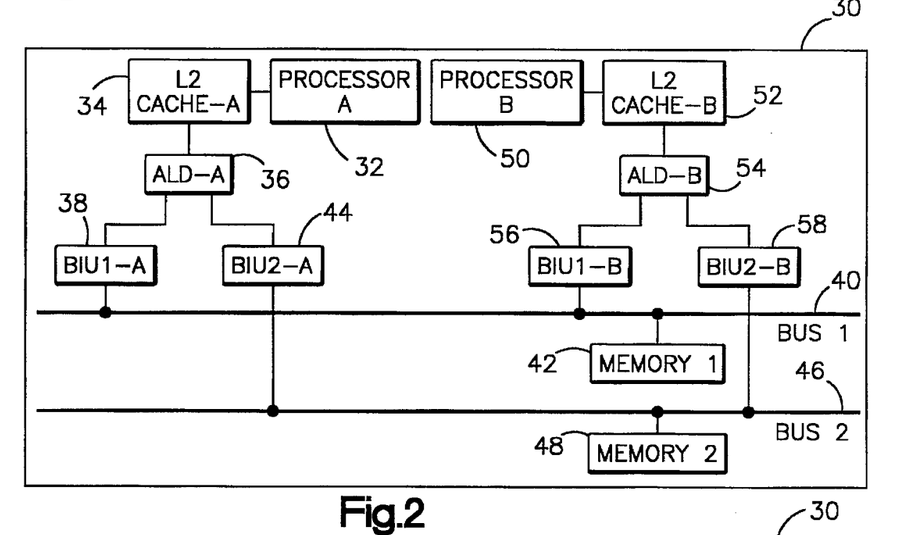
FIG. 2 is a block diagram of a multi-processor information handling system incorporating two multi-processor bus/memory subsystem groups of this invention.

Referring now to FIG. 2, the incorporation of two multi-processor bus/memory subsystem groups into Multi-processor Information Handling System 30 as provided by the present invention is illustrated. Processor Unit A 32 has L2 Cache Memory 34 associated therewith to store copies of information for use by Processor Unit A 22. Processor Unit A 32 also has Address Location Director 36 associated therewith to direct memory operations via Bus Interface Unit 38 and First Multi-processor Bus 40 to memory addresses located in First Memory Subsystem 42. Address Location Director 36 also directs memory operations via Bus Interface Unit 44 and Second Multi-processor Bus 46 to memory addresses located in Second Memory Subsystem 48. Processor Unit B 50 has L2 Cache Memory 52 associated therewith to store copies of information for use by Processor Unit B 50. Processor Unit B 50 also has Address Location Director 54 associated therewith to direct memory operation requests via Bus Interface Unit 56 and First Multi-Processor Bus 40 to memory addresses located in First Memory Subsystem 42. Address Location Director 54 also directs memory operations via Bus Interface Unit 58 and Second Multi-Processor Bus 46 to memory addresses located in Second Memory Subsystem 48.

Figure 3:
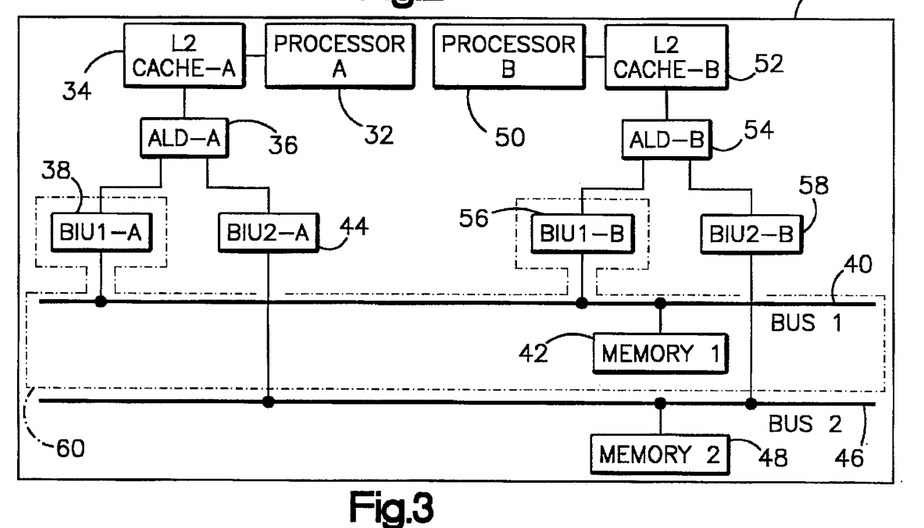
FIG. 3 is a block diagram of the first multi-processor bus/memory subsystem group of FIG. 2.
Figure 4:
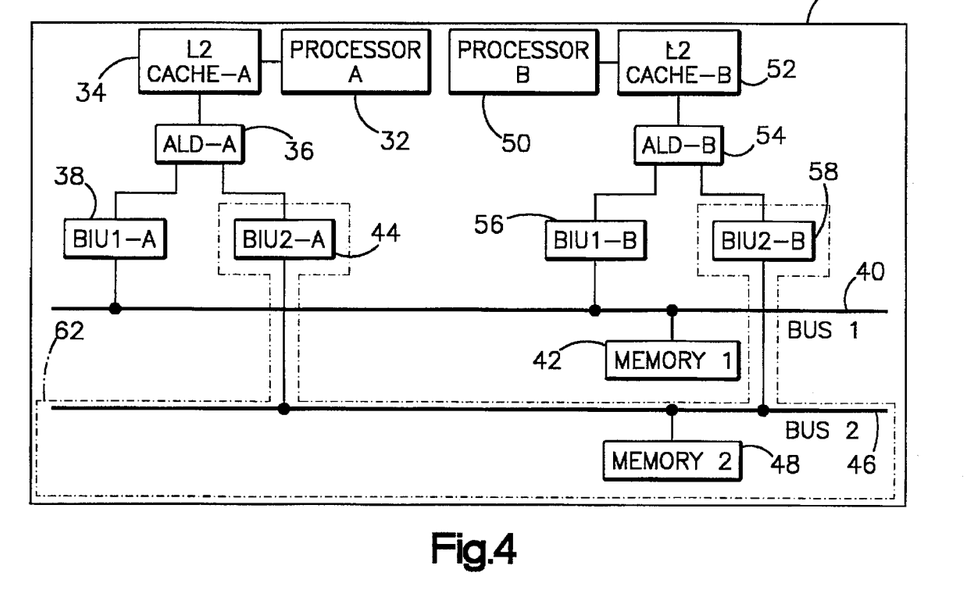
FIG. 4 is a block diagram of the second multi-processor bus/memory subsystem group of FIG. 2.

As illustrated in FIG. 2, Multi-processor Information Handling System 30 includes two multi-processor bus/memory subsystem groups. FIG. 3 illustrates Multi-processor Bus/Memory Subsystem Group 60 and FIG. 4 illustrates Multi-processor Bus/Memory Subsystem Group 62.

As provided under the present invention, First Memory Subsystem 42 and Second Memory Subsystem 48 are configured with a number of memory addresses that is appropriate for the specific multi-processor system application. For the case where the memory addresses are equally distributed among the memory subsystems, each memory subsystem has 1/n memory addresses, where the variable "n" represents the number of multi-processor bus/memory subsystem groups incorporated in the multi-processor system design. Referring again to FIG. 2, if the design application requires the memory addresses to be equally distributed, then one-half of the memory addresses are allocated to First Memory Subsystem 42 and the other one-half of the memory addresses are allocated to Second Memory Subsystem 48. The memory addresses of First Memory Subsystem 42 are independently accessible by First Processor 32 and Second Processor 50 via First Multi-processor Bus 40. Similarly, the memory addresses of Second Memory Subsystem are independently accessible by First Processor 32 and Second Processor 50 via Second Multi-processor Bus 46. The present invention allows multi-processor information handling systems to be configured with an infinite number of multi-processor bus/memory subsystem groups.

To achieve memory bandwidth expansion in a multi-processor design using multiple multi-processor bus/memory subsystem groups, an address location director is incorporated between the L2 cache memory and the bus interface unit of each processor. The address location director can be a separate device or can be incorporated into the design of the bus interface unit for each bus. The address location director is located between the L2 cache memory and all of the other bus interface unit functions. Thus, all of the bus interface unit functions which are not related to the address location director functions must be replicated in each bus interface unit to allow each multi-processor bus/memory subsystem group to operate independently of the other multi-processor bus/memory subsystem groups and to allow multiple concurrent memory operations.

The address location director contains sufficient information to determine which memory subsystem each memory request must access and logic to direct each memory request to the appropriate bus interface unit, multi-processor bus, and memory subsystem. The address location director also contains logic to direct the replies received from each memory subsystem via the associated multi-processor bus and bus interface unit to the requesting processor.

At system start-up, the address location director is loaded with an address director program and with a memory subsystem address directory. The address director program compares memory request addresses with the memory subsystem address directory and directs memory requests to the appropriate bus interface unit, multi-processor bus, and memory subsystem. As is well known to those skilled in the art, the address location director can be a microprocessor which can be loaded with the address director program and the memory subsystem address directory during the power on system test interval. In addition, an alternative embodiment of the address location direction can utilize an aggressive operating system to dynamically reconfigure the memory subsystems during system operation based upon changing workloads to maximize the system performance gains which can be achieved by using the multiple multi-processor bus/memory subsystem groups of the present invention.

During system operation, a processor generates a memory request to perform a memory operation with a specified memory address and presents this memory address to the address location director. The address location director program compares the specified memory address with the memory subsystem address directory and directs the memory request to the appropriate bus interface unit, multi-processor bus, and memory subsystem. For example, a multi-processor information handling system comprising two multi-processor bus/memory subsystem groups can have the memory addresses divided on odd boundaries and on even boundaries such that the odd memory addresses are located in the first memory subsystem and the even memory addresses are located in the second memory subsystem. Thus, a memory request from a requesting processor for access to an odd memory address is routed by that processor's address location director to the first memory subsystem via the bus interface unit and multi-processor bus associated with that connected bus transaction; and a memory request from a requesting processor for access to an even memory address is routed by that processor's address location director to the second memory subsystem via the bus interface unit and multi-processor bus associated with that connected bus transaction.

Referring again to FIG. 2, Address Location Director 36 is configured to recognize the memory address locations of memory operations associated with Processor Unit A 32 and to direct those memory operations to either First Memory Subsystem 42 via Bus Interface Unit 38 and First Multi-Processor Bus 40 or Second Memory Subsystem 48 via Bus Interface Unit 44 and Second Multi-processor Bus 46. Similarly, Address Location Director 54 is configured to recognize the memory address locations of memory operations associated with Processor Unit B 50 and to direct those memory operations to either First Memory Subsystem 42 via Bus Interface Unit 56 and First Multi-Processor Bus 40 or Second Memory Subsystem 48 via Bus Interface Unit 58 and Second Multi-processor Bus 46.

In operation, memory requests from Processor Unit A 32 are received by Address Location Director 36 and the correct multi-processor bus/memory subsystem information paths are determined. Address location Director 36 directs memory requests to either Bus Interface Unit 38 for accessing a memory address located in First Memory Subsystem 42 or Bus Interface Unit 44 for accessing a memory address located in Second Memory Subsystem 48. Bus Interface Unit 38 arbitrates for access to First Multi-processor Bus 40 for memory requests directed to First Memory Subsystem 42. Bus Interface Unit 44 arbitrates for access to Second Multi-processor Bus 46 for memory requests directed to Second Memory Subsystem 48. Similarly, memory requests from Processor Unit B 50 are received by Address Location Director 54 and the correct multi-processor bus/memory subsystem information paths are determined. Address Location Director 54 directs memory requests to either Bus Interface Unit 56 for accessing a memory address located in First Memory Subsystem 42 or Bus Interface Unit 58 for accessing a memory address located in Second Memory Subsystem 48. Bus Interface Unit 56 arbitrates for access to First Multi-processor Bus 40 for memory requests directed to First Memory Subsystem 42. Bus Interface Unit 58 arbitrates for access to Second Multi-processor Bus 46 for memory requests directed to Second Memory Subsystem 48. Upon access being granted to the appropriate multi-processor bus for a WRITE request memory operation, the memory address is presented and the information to be written follows the WRITE request to the memory address in the appropriate memory subsystem and an acknowledgement signal is returned to the requesting processor. Upon access being granted to the appropriate multi-processor bus for a READ request memory operation, the memory address is presented and the information to be read is returned to the requesting processor. This series of operations allows multiple memory requests to be handled concurrently by the Multi-processor Bus/Subsystem Memory Group 60 and Multi-processor Bus/Memory Subsystem Group 62.

Figure 5:
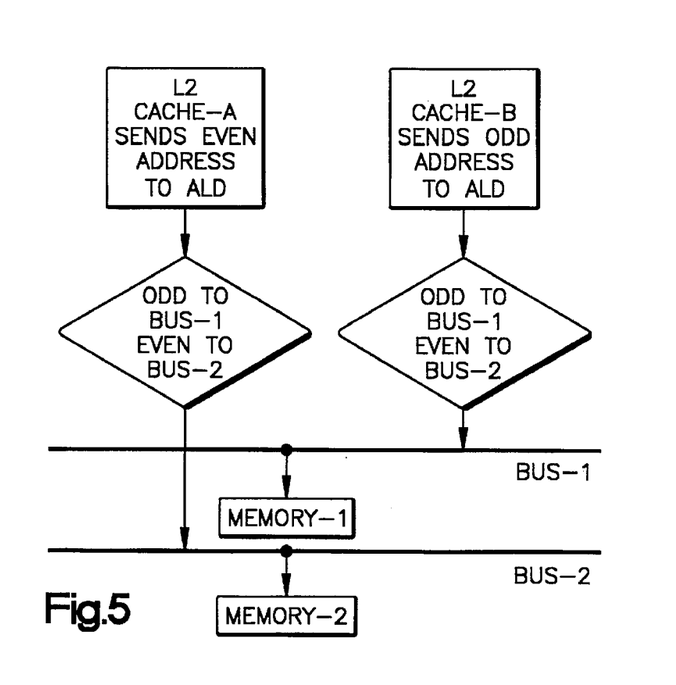
FIG. 5 is a flow diagram illustrating multiple concurrent memory requests in a multi-processor information handling system incorporating two multi-processor bus/memory subsystem groups of this invention.

FIG. 5 is a flow diagram illustrating multiple concurrent memory requests in a multi-processor information handling system incorporating two multi-processor bus/memory subsystem groups of this invention. As shown in FIG. 5, L2 Cache Memory A is requesting an even memory address at the same time that L2 Cache Memory B is requesting an odd memory address. These two memory accesses are performed concurrently such that the even memory address access of Memory Subsystem 2 via Multi-processor Bus 2 occurs at the same time as the odd memory address access of Memory Subsystem 1 via Multi-processor Bus 1. If L2 Cache Memory A and L2 Cache Memory B concurrently request a memory address (either odd or even) located in the same memory subsystem, then the two memory accesses are performed sequentially pursuant to the arbitration protocol established for the multi-processor bus associated with that memory system. Alternatively, the memory addresses can be divided by memory banks, by memory pages, or by other division techniques suitable for the application. As is well known to those skilled in the art, the preferred operating environment configuration varies with, and depends upon, the operating system and application. The expected optimal performance is achieved by incorporating a memory division technique such that total memory accesses from all of the requesting processors are uniformly distributed among the multiple memory subsystems.

The operation of the present invention can be set at system start-up and never be changed so as to be transparent to the system software. This transparent operation mode does not preclude the incorporation of aggressive operating systems to dynamically reconfigure the memory subsystems to take maximum advantage of the system performance gains which can be achieved using two or more multi-processor bus/memory subsystem groups. It is to be appreciated that an operating system can be incorporated to change the address director program and the memory subsystem map directory such that the multi-processor information handling system is dynamically reconfigurable for varying system workload environments.

The practice of this invention does not require any special relationship relating to memory capacity, memory operating speed, or other characteristics among the multiple memory subsystems. However, it is to be appreciated that a true symmetric multi-processor system can obtain optimum performance by incorporating memory subsystems having the same memory capacity, operating speed, or other characteristics.

Figure 6:
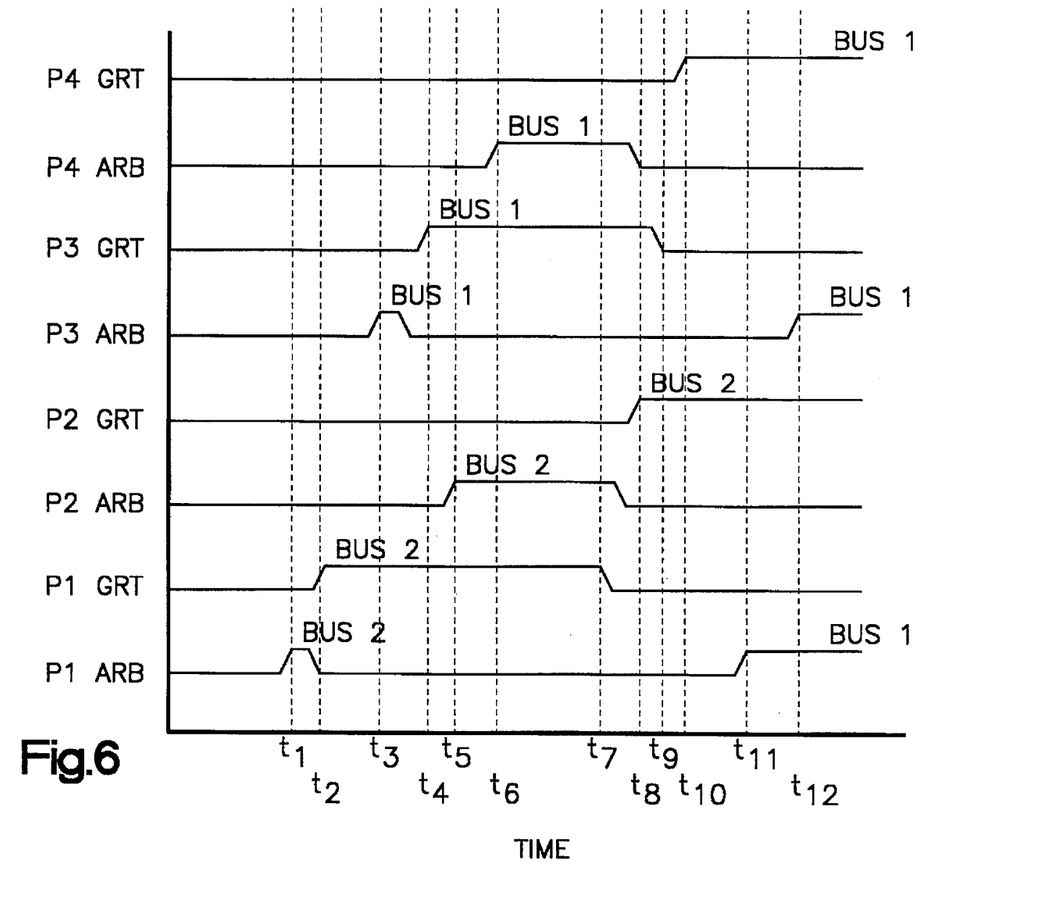
FIG. 6 is a timing diagram illustrating multiple concurrent memory requests for a multi-processor information handling system incorporating four processors and two multi-processor bus/memory subsystem groups of this invention.

FIG. 6 is a representative timing diagram illustrating concurrent memory requests in a multi-processor information handling system incorporating four processors and two multi-processor bus/memory subsystem groups of the present invention. The representative timing for concurrent memory requests using this design configuration is as follows: (parenthetical numerical references correspond to times indicated by the subscript to time "t" in FIG. 6) (1) Processor 1 arbitrates for access to Multi-processor Bus 2; (2) Processor 1 is granted access to Multi-processor Bus 2; (3) Processor 3 arbitrates for access to Multi-processor Bus 1; (4) Processor 3 is granted access to Multi-processor Bus 1; (5) Processor 2 arbitrates for access to Multi-processor Bus 2; (6) Processor 4 arbitrates for access to Multi-processor Bus 1; (7) Processor 1 releases Multi-processor Bus 2; (8) Processor 2 is granted access to Multi-processor Bus 2; (9) Processor 3 releases Multi-processor Bus 1; (10) Processor 4 is granted access to Multi-processor Bus 1; (11) Processor 1 arbitrates for access to Multi-processor processor Bus 1; and (12) Processor 3 arbitrates for access to Multi-Processor Bus 1. Thus, by using the multiple multi-processor bus/memory subsystem groups of the present invention, multiple memory requests can be handled concurrently to effectively increase system bandwidth and to improve overall system performance.

The present invention allows the incorporation of an infinite number of multi-processor bus/memory subsystem groups into a multi-processor information handling system design to allow multiple concurrent memory operations to occur. The incorporation of "n" multi-processor bus/memory subsystem groups allows "n" concurrent memory operations to be performed. Therefore, a multi-processor information handling system incorporating two multi-processor bus/subsystem groups has twice the system bandwidth of the prior art design incorporating a single multi-processor bus/memory subsystem group. Thus, the incorporation of "n" multi-processor bus/subsystem groups yields an "n-fold" increase in system bandwidth.

The present invention effectively eliminates the memory subsystem access bottleneck associated with high-speed, connected transaction multi-processor systems by allowing the multi-processor buses to be infinitely scalable and allowing the memory bandwidth to be infinitely scalable. Simulation experiments have indicated that the memory bandwidth expansion achieved by the present invention can improve multi-processor system performance by up to fifty percent, or more, with the incorporation of two multi-processor bus/memory subsystem groups. Thus, the present invention improves multi-processor information handling system performance.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, this invention contemplates multi-processor information handling system designs having the same number of multi-processor bus/subsystem memory groups as the number of processors, multi-processor information handling system designs having a lesser number of multi-processor bus/memory subsystem groups than the number of processors, and multi-processor information handling system designs having a greater number of multi-processor bus/memory subsystem groups than the number of processors. Therefore, the invention in its broader aspects is not limited to the specific details, representative apparatus and method, and illustrative examples shown and described. Accordingly, departures may be made from such details without departing from the spirit or scope of the inventor's general inventive concept.

I claim:

1. A multi-processor information handling system, comprising:

(a) a first processor;

(b) a second processor;

(c) it first memory subsystem having a first set of memory addresses;

(d) it second memory subsystem having a second set of memory addresses;

(e) a first multi-processor bus for transferring information:
   (1) between said first processor and said first memory subsystem; and
   (2) between said second processor and said first memory subsystem;

(f) a second multi-processor bus for transferring information:
   (1) between said first processor and said second memory subsystem; and
   (2) between said second processor and said second memory subsystem; said first and second multi-processor buses using independent arbitration protocols;

(g) a first processor address location director configured for directing first processor memory operations to said first memory subsystem and to said second memory subsystem;

(h) it first processor first multi-processor bus interface unit connected between said first processor and said first multi-processor bus, and being configured for accessing said first set of memory addresses of said first memory subsystem responsive to said first processor address location actor, wherein information for performing first processor memory operations is transferred between said first processor and said first memory subsystem;

(i) a first processor second multi-processor bus interface unit connected between said first processor and said second multi-processor bus, and being configured for accessing said second set of memory addresses of said second memory subsystem responsive to said first processor address location director, wherein information performing first processor memory operations is transferred between said first processor and said second memory subsystem;

(j) a second processor address location director configured for directing second processor memory operations to said first memory subsystem and to said second memory subsystem, said first and second processor address location directors each comprising a programmable microprocessor into which may be programmed an address director program and a memory subsystem address directory;

(k) a second processor first multi-processor bus interface unit connected between said second processor and said first multi-processor bus, and being configured for accessing said first set of memory addresses of said first memory subsystem responsive to said second processor address location director, wherein information for performing second processor memory operations is transferred between said second processor and said first memory subsystem independently and concurrently while information for performing first processor memory operations is transferred between said first processor and said second memory subsystem; and (l) a second processor second multi-processor bus interface unit connected between said second processor and said second multi-processor bus, and being configured for accessing said second set of memory addresses of said second memory subsystem responsive to said second processor address location director, wherein information for performing second processor memory operations is transferred between said second processor and said second memory subsystem independently and concurrently while information for performing first processor memory operations is transferred between said first processor and said first memory subsystem.

2. A multi-processor information handling system, comprising:

(a) a first processor;

(b) a second processor;

(c) a third processor;

(d) a first memory subsystem having a first set of memory addresses;

(e) a second memory subsystem having a second set of memory addresses;

(f) a first multi-processor bus for transferring information:
   (1) between said first processor and said first memory subsystem;
   (2) between said second processor and said first memory subsystem; and
   (3) between said third processor and said first memory subsystem;

(g) a second multi-processor bus for transferring information:
   (1) between said first processor and said second memory subsystem;
   (2) between said second processor and said second memory subsystem; and
   (3) between said third processor and said second memory subsystem;

said first and second multi-processor buses using independent arbitration protocols;

(h) a first processor address location director configured for directing first processor memory operations to said first memory subsystem and to said second memory subsystem;

(i) a first processor first multi-processor bus interface unit connected between said first processor and said first multi-processor bus, and being configured for accessing said first set of memory addresses of said first memory subsystem responsive to said first processor address location director, wherein information for performing first processor memory operations is transferred between said first processor and said first memory subsystem;

(j) a first processor second multi-processor bus interface unit connected between said first processor and said second multi-processor bus, and being configured for accessing said second set of memory addresses of said second memory subsystem responsive to said first processor address location director, wherein information for performing first processor memory operations is transferred between said first processor and said second memory subsystem;

(k) a second processor address location director configured for directing second processor memory operations to said first memory subsystem and to said second memory subsystem;

(l) a second processor first multi-processor bus interface unit connected between said second processor and said first multi-processor bus, and being configured for accessing said first set of memory addresses of said first memory subsystem responsive to said second processor address location director, wherein information for performing second processor memory operations is transferred between said second processor and said first memory subsystem;

(m) a second processor second multi-processor bus interface unit connected between said second processor and said second multi-processor bus, and being configured for accessing said second set of memory addresses of said second memory subsystem responsive to said second processor address location director, wherein information for performing second processor memory operations is transferred between said second processor and said second memory subsystem;

(n) a third processor address location director configured for directing third processor memory operations to said first memory subsystem and to said second memory subsystem, said first, second and third processor address location directors each comprising a programmable microprocessor into which may be programmed an address director program and a memory subsystem address directory;

(o) a third processor first multi-processor bus interface unit connected between said third processor and said first multi-processor bus, and being configured for accessing said first set of memory addresses of said first memory subsystem responsive to said third processor address location director, wherein information for performing third processor memory operations is transferred between said third processor and said first memory subsystem independently and concurrently while information for performing first or second processor memory operations is transferred between said first or second processor, respectively, and said second memory subsystem; and (p) a third processor second multi-processor bus interface unit connected between said third processor and said second multi-processor bus, and being configured for accessing said second set of memory addresses of said second memory subsystem responsive to said third processor address location director, wherein information for performing third processor memory operations is transferred between said third processor and said second memory subsystem independently and concurrently while information for performing first or second processor memory operations is transferred between said first or second processor, respectively, and said first memory subsystem.

3. A method of multi-processor information handling, comprising the steps of:

(a) accessing a first set of memory addresses of a first memory subsystem for performing a first processor memory operation responsive to a first processor address location director;

(b) transferring information between a first processor and said fast memory subsystem via a first processor first multi-processor bus interface unit and a first multi-processor bus:

(c) accessing a second set of memory addresses of a second memory subsystem for performing said first processor memory operation responsive to said first processor address location director;

(d) transferring information between said first processor and said second memory subsystem via a first processor second multi-processor bus interface unit and a second multi-processor bus, said first and second multi-processor buses using independent arbitration protocols;

(e) accessing said first set of memory addresses of said first memory subsystem for performing a second processor memory operation responsive to a second processor address location director, said first and second processor address location directors each comprising a programmable microprocessor into which may be programmed an address director program and a memory subsystem address directory;

(f) transferring information between a second processor and said first memory subsystem via a second processor first multi-processor bus interface unit and said first multi-processor bus independently and concurrently while information for performing said first processor memory operation is transferred between said first processor and said second memory subsystem;

(g) accessing said second set of memory addresses of said second memory subsystem for performing said second processor memory operation responsive to said second processor address location director; and (h) transferring information between said second processor and said second memory subsystem via a second processor second multi-processor bus interface unit and said second multi-processor bus independently and concurrently while information for performing said first processor memory operation is transferred between said first processor and said first memory subsystem.

4. A method of multi-processor information handling, comprising the steps of:

(a) accessing a first set of memory addresses of a first memory subsystem for performing a first processor memory operation responsive to a first processor address location director;

(b) transferring information between a first processor and said first memory subsystem via a first processor first multi-processor bus interface unit and a first multi-processor bus;

(c) accessing a second set of memory addresses of a second memory subsystem for performing said first processor memory operation responsive to said first processor address location director;

(d) transferring information between said first processor and said second memory subsystem via a first processor second multi-processor bus interface unit and a second multi-processor bus, said first and second multi-processor buses using independent arbitration protocols;

(e) accessing said first set of memory addresses of said first memory subsystem for performing s second processor memory operation responsive to a second processor address location director;

(f) transferring information between a second processor and said first memory subsystem via a second processor first multi-processor bus interface unit and said first multi-processor bus;

(g) accessing said second set of memory addresses of said second memory subsystem for performing said second processor memory operation responsive to said second processor address location director;

(h) transferring information between said second processor and said second memory subsystem via a second processor second multi-processor bus interface unit and said second multi-processor bus;

(i) accessing said first set of memory addresses of said first memory subsystem for performing a third processor memory operation responsive to a third processor address location director, said first, second and third processor address location directors each comprising a programmable microprocessor into which may be programmed an address director program and a memory subsystem address directory;

(j) transferring information between a third processor and said first memory subsystem via a third processor first multi-processor bus interface unit and said first multi-processor bus independently and concurrently while information for performing said first or second processor memory operations is transferred between said first or second processor, respectively, and said second memory subsystem;

(k) accessing said second set of memory addresses of said second memory subsystem for performing said third processor memory operation responsive to said third processor address location director; and (l) transferring information between said third processor and said second memory subsystem via a third processor second multi-processor bus interface unit and said second multi-processor bus independently and concurrently while information for performing said first or second processor memory operations is transferred between said first or second processor, respectively, and said first memory subsystem.

* * * * *

UNITED STATES PATENT AND TRADEMARK OFFICE
CERTIFICATE OF CORRECTION

PATENT NO : 5,636,361
DATED : June 3, 1997
INVENTOR(S): Donald Ingerman

It is certified that error appears in the above-identified patent and that said Letters Patent is hereby corrected as shown below:

Column 10, line 66, item (c) - change "it" to --a--.

Column 11, line 1, item (d) - change "it" to --a--.

Column 11, line 20, item (h) - Change "it" to --a--.

Column 11, line 25, item (h) - Change "actor" to --director--.

Column 13, line 43, item (b) - Change "fast" to --first--.

Signed and Sealed this

Twenty-eighth Day of October, 1997

Attest:

BRUCE LEHMAN

Attesting Officer

Commissioner of Patents and Trademarks